(12) United States Patent
Jang et al.

(10) Patent No.: US 11,245,139 B2
(45) Date of Patent: Feb. 8, 2022

(54) BATTERY MODULE AND MANUFACTURING METHOD FOR THE SAME

(71) Applicant: LG CHEM, LTD., Seoul (KR)

(72) Inventors: Jae Young Jang, Daejeon (KR); Youngsu Son, Daejeon (KR); Young Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 15 days.

(21) Appl. No.: 16/487,630

(22) PCT Filed: Oct. 10, 2018

(86) PCT No.: PCT/KR2018/011891
§ 371 (c)(1),
(2) Date: Aug. 21, 2019

(87) PCT Pub. No.: WO2019/074268
PCT Pub. Date: Apr. 18, 2019

(65) Prior Publication Data
US 2019/0386353 A1 Dec. 19, 2019

(30) Foreign Application Priority Data
Oct. 11, 2017 (KR) .......................... 10-2017-0129639

(51) Int. Cl.
*H01M 10/48* (2006.01)
*H01M 50/54* (2021.01)
(Continued)

(52) U.S. Cl.
CPC ........... *H01M 10/482* (2013.01); *B23K 11/11* (2013.01); *H01M 50/20* (2021.01); *H01M 50/543* (2021.01)

(58) Field of Classification Search
CPC ..... H01M 50/543; H01M 50/50; B23K 11/11; B23K 2103/12; B23K 2103/10; B23K 2103/08; B23K 2103/26; B23K 11/185
(Continued)

(56) References Cited

U.S. PATENT DOCUMENTS 8,603,664 B2   12/2013   Ishizu et al.
8,962,176 B2   2/2015   Caumont et al.
(Continued)

FOREIGN PATENT DOCUMENTS

CN   102171859 A   8/2011
CN   102195072 A   9/2011
(Continued)

OTHER PUBLICATIONS

Extended European Search Report for European Application No. 18865562.5, dated May 7, 2020.
(Continued)

*Primary Examiner* — Christian Roldan
(74) *Attorney, Agent, or Firm* — Birch, Stewart, Kolasch & Birch, LLP (57) ABSTRACT

A battery module includes at least one battery cell array including a cell frame and a plurality of battery cells, each battery cell having electrode terminals disposed at both ends of each battery cell and oriented toward the same direction, the plurality of battery cells being disposed in a lateral direction when mounted in the cell frame; and a plurality of connection members attached to the electrode terminals of a respective battery cell of the at least one battery cell array at an upper portion, a lower portion, or both of the at least one battery cell array, wherein each connection member is a metal plate having at least three vertical slits that are spaced apart from each other and a horizontal slit that crosses at least one of the vertical slits.

13 Claims, 7 Drawing Sheets

(51) Int. Cl.
　　*B23K 11/11*　　(2006.01)
　　*H01M 50/20*　　(2021.01)
　　*H01M 50/543*　(2021.01)

(58) Field of Classification Search
　　USPC .......................................................... 429/61
　　See application file for complete search history.

(56) References Cited

U.S. PATENT DOCUMENTS

| | | |
|---|---|---|
| 2010/0216001 A1 | 8/2010 | Byun et al. |
| 2011/0076543 A1 | 3/2011 | Ro |
| 2011/0229748 A1 | 9/2011 | Sugii et al. |
| 2011/0262777 A1 | 10/2011 | Choi et al. |
| 2011/0281151 A1 | 11/2011 | Lee |
| 2011/0293995 A1 | 12/2011 | Sasaki et al. |
| 2012/0073848 A1 | 3/2012 | Shimizu et al. |
| 2014/0220414 A1* | 8/2014 | Lee ................. H01M 50/20 429/156 |
| 2016/0181579 A1 | 6/2016 | Geshi et al. |
| 2017/0099073 A1 | 4/2017 | Peters |

FOREIGN PATENT DOCUMENTS

| | | | |
|---|---|---|---|
| CN | 102244225 | A | 11/2011 |
| CN | 103769780 | * | 5/2014 |
| CN | 103769780 | A | 5/2014 |
| CN | 204966578 | * | 1/2016 |
| CN | 204966578 | U | 1/2016 |
| CN | 105474434 | A | 4/2016 |
| CN | 206194851 | U | 5/2017 |
| EP | 2 337 116 | A2 | 6/2011 |
| EP | 2 367 219 | A2 | 9/2011 |
| JP | 2004-171856 | A | 6/2004 |
| JP | 2006-107808 | A | 4/2006 |
| JP | 2006-338964 | A | 12/2006 |
| JP | 4675163 | B2 | 4/2011 |
| JP | 5372562 | B2 | 12/2013 |
| JP | 2016-22508 | A | 2/2016 |
| KR | 10-2001-0056041 | A | 7/2001 |
| KR | 10-2010-0096720 | A | 9/2010 |
| KR | 10-2011-0035474 | A | 4/2011 |
| KR | 10-2012-0032742 | A | 4/2012 |
| KR | 10-1440892 | B1 | 9/2014 |
| KR | 10-1485621 | B1 | 1/2015 |
| KR | 10-2016-0079220 | A | 7/2016 |
| KR | 10-2019-0040565 | A | 4/2019 |
| TW | 201042859 | A1 | 12/2010 |

OTHER PUBLICATIONS

International Search Report issued in PCT/KR2018/011891 (PCT/ISA/210), dated Apr. 3, 2019.
Written Opinion of the International Searching Authority issued in PCT/KR2018/011891 (PCT/ISA/237), dated Apr. 3, 2019.

* cited by examiner

Initial bonding step → Additional bonding step

[Figure 9]

BATTERY MODULE AND
MANUFACTURING METHOD FOR THE
SAME

TECHNICAL FIELD

This application claims priority to and the benefit of Korean Patent Application No. 10-2017-0129639 filed in the Korean Intellectual Property Office on Oct. 11, 2017, the entire contents of which are incorporated herein by reference.

The present invention relates to a battery module and a manufacturing method for the same.

BACKGROUND ART

Recently, a rechargeable battery which can be charged and discharged is widely used as an energy source of a wireless mobile device. Further, the rechargeable battery is also attracting attention as an energy source for electric vehicles and hybrid electric vehicles which are proposed as solutions for air pollution of existing gasoline vehicles and diesel vehicles which use fossil fuels. Accordingly, there are various types of applications using rechargeable batteries due to the advantages of the rechargeable battery and the rechargeable battery is expected to be applied to more fields and products in the future.

Rechargeable batteries are classified into a lithium ion battery, a lithium ion polymer battery, and a lithium polymer battery depending on the configurations of the electrode and the electrolytic solution. Among them, the usage of the lithium ion polymer battery which has a low possibility of leakage of the electrolytic solution and can be easily manufactured is increasing.

Generally, the rechargeable battery is classified into a cylindrical battery cell and a prismatic battery cell in which an electrode assembly is embedded in a cylindrical metal can or a prismatic metal can, respectively and a pouch type battery cell in which the electrode assembly is embedded in a pouch type case formed of an aluminum laminate sheet, depending on a shape of the battery case.

Among them, the cylindrical battery cell has a larger electric capacitance than that of the prismatic battery cell and the pouch type battery cell. The cylindrical battery cell is used as a single battery depending on the type of external device to be used and also used as a battery module or a battery pack in which a plurality of battery cells is electrically connected, in consideration of the output and the capacity.

Figure 1:
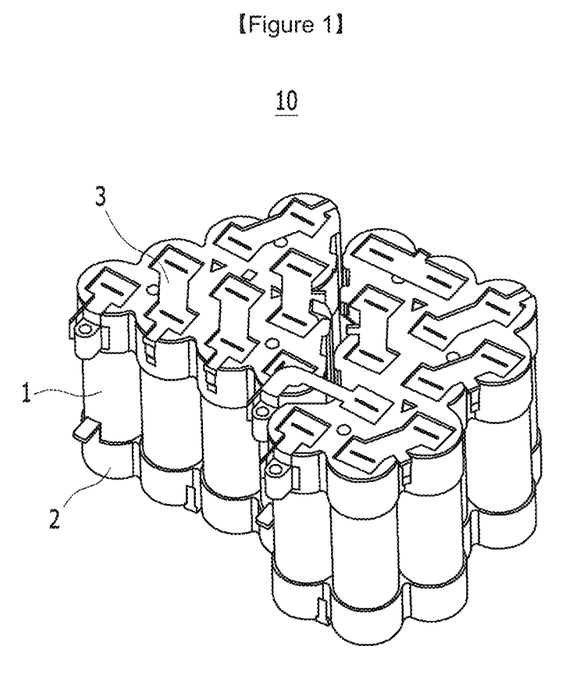
FIG. 1 is a schematic view of a battery module according to the related art.

With regard to this, FIG. 1 illustrates a schematic view of a battery module configured by cylindrical battery cells.

Referring to FIG. 1, a battery module 10 includes a cell array in which cylindrical battery cells 1 are disposed on the sides, a connection member 3 connected to the battery cell 1 of the cell array, and a cell frame 2 which fixes the cell array and the connection member 3.

The connection member 3 is a plate formed of an electro-conductive metal material and is a bus bar which is electrically and mechanically connected to an electrode terminal of the battery cell 1 and electrically connects the adjacent battery cells 1 to each other.

A metallic connection member and the electrode terminal of the battery cell are generally welded to be connected to each other. Among welding methods, since a resistance welding method is easily treated and causes less change of a metal tissue to minimize the deformation of the electrode terminal and is relatively stable for deterioration of the battery cell due to a low temperature at the time of welding, the resistance welding is widely used.

Figure 2:
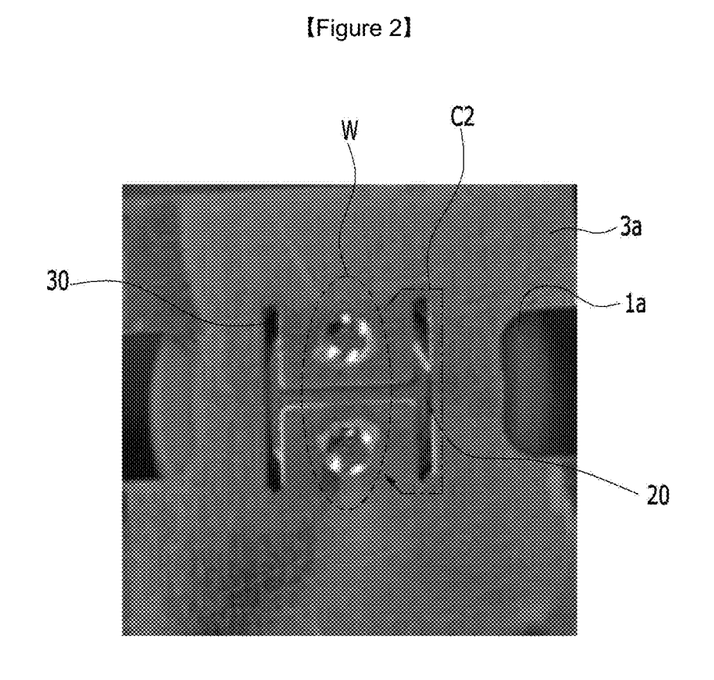
FIGS. 2 to 4 are a photograph and schematic views of a bonding type between a connection member and an electrode terminal of a battery cell using resistance welding.
Figure 3:
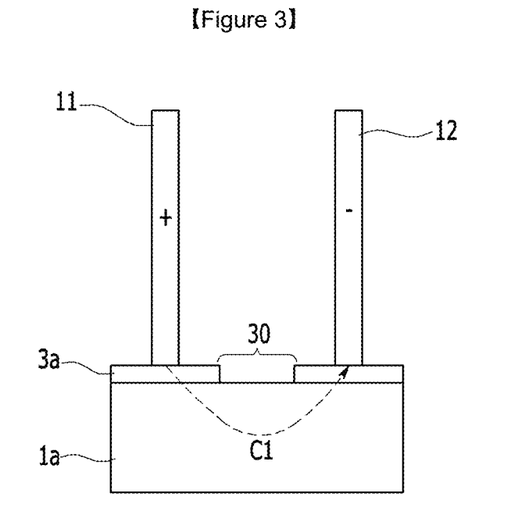
Figure 4:
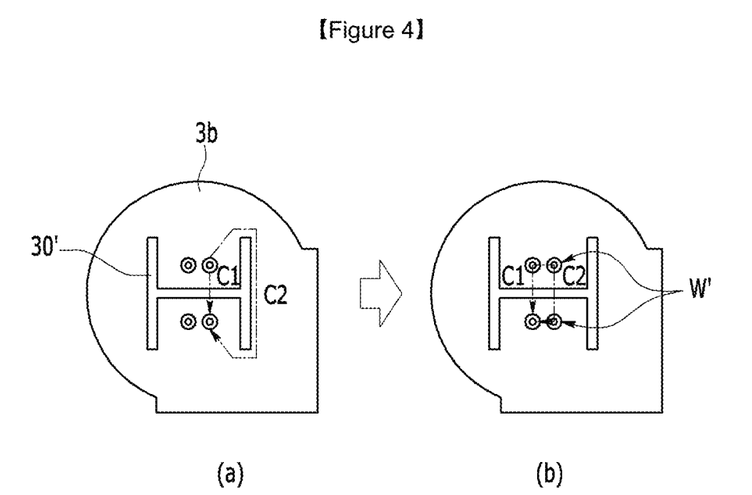

Therefore, FIGS. 2 to 4 illustrate a photograph and schematic views of a bonding form between the connection member and the electrode terminal of the battery cell using the resistance welding.

Referring to FIGS. 2 to 4, according to the resistance welding, an active current is applied via the connection member 3a and the electrode terminal 111 which are closely adhered to each other while pressurizing a welded portion W of the connection member 3a which is a welding basic material to the electrode terminal 111 of the battery cell 1a with a pair of welding rods 11 and 12 which are positive and negative and the connection member 3a is caused to be locally melted with a resistance heat generated at this time.

However, a reactive current C2 which does not participate the welding is also generated during this process. The reactive current is a powerless current which is applied only via a connection member 3a having a relatively low resistance excluding an electrode terminal 111 having a high resistance because remaining portions of the connection member 3a which are not pressurized by the welding rods 11 and 12 have a high interface resistance with the electrode terminal 111.

In contrast, the welded portion W pressurized by the welding rods 11 and 12 is closely adhered to the electrode terminal so that the current flowing therethrough serves as an active current C1.

If the application of the active current C1 and the reactive current C2 is concentrated on the welded portion W of the connection member 3a, an overcurrent is formed in the welded portion W so that defects such as destruction, fracture, and an inferior welding quality may be caused.

Therefore, as illustrated in FIG. 2 and FIG. 3, a slit 30 is formed in the connection member 3a to detour the reactive current C2 along the slit 30.

In the meantime, for the purpose of stable connection between the connection member and the electrode terminal, as illustrated in FIG. 4, resistance welding is sequentially performed two times or more for every connection member 3b.

Figure 5:
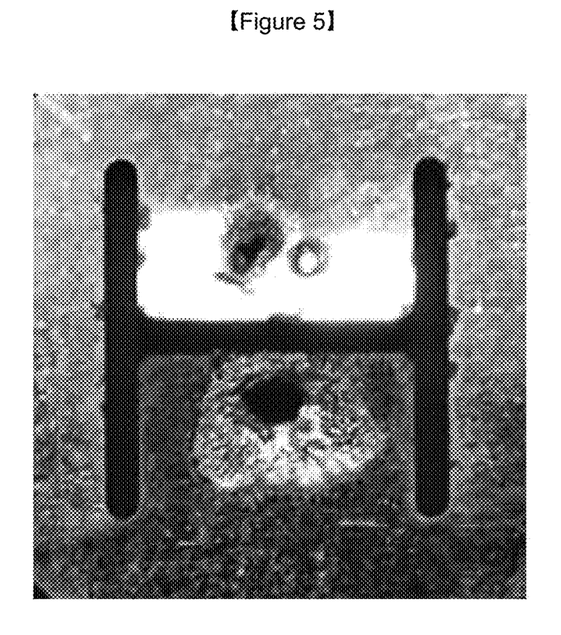
FIG. 5 is a photograph of a connection member in which a defect according to resistance welding is caused.

However, as illustrated in FIG. 4B, when the resistance welding is additionally performed on the connection member 3b, the reactive current C2 is also applied through the welded portion W', so that the slit 30' becomes useless. Therefore, the active current C1 and the reactive current C2 are concentrated on the adjacent welded portions so that the connection member 3b is destructed or the welding quality is extremely deteriorated due to the overcurrent thereby. As for the problem, an actual photograph is illustrated in FIG. 5.

Particularly, in the case of a connection member formed of a metal material such as copper having a low resistance and high electric conductivity due to the high purity, the above-mentioned problem is frequently generated so that for this reason, it is very difficult to perform resistance welding two times or more.

Accordingly, there is a need for a technique which can fundamentally solve the above-mentioned problem.

DISCLOSURE

Technical Problem

The present invention has been made in an effort to solve the problems of the related art and technical objects which have been requested from the past.

Particularly, another object of the present invention is to provide a battery module in which an electrode terminal of a battery cell and a connection member are bonded to each other with a desired shape and a desired quality even though resistance welding is performed two or more times and the bonded shape is stably maintained despite the external impact and vibration.

Still another object of the present invention is to provide a manufacturing method of the battery module.

Technical Solution

In order to achieve the above-mentioned object, a battery module according to the present invention includes: at least one battery cell array in which a plurality of battery cells in which electrode terminals disposed at both ends of the battery cell are located toward the same direction is disposed in a lateral direction to be mounted in a cell frame; and a plurality of connection members which is bonded to the electrode terminal of each battery cell of the battery cell array at an upper portion and/or a lower portion of the battery cell array and the connection member is a metal plate in which at least three vertical slits which are spaced apart from each other and a horizontal slit crossing at least one of the vertical slits are perforated.

The advantage of the battery module according to the present invention is that the connection member is partitioned by three or more vertical slits and a horizontal slit which connects the vertical slits into a plurality of parts and the electrode terminal and the connection member form a stable bonding structure while being bonded to the electrode terminal at each part.

Particularly, the connection member may be multiple-bonded to the electrode terminal in a state in which the resistance welding is performed at each part at least two times and thus in the battery module according to the present invention including the connection member, based on the multiple-bonded structure, an electrical connection structure between the battery cell and the connection member may be stable despite the external force such as the vibration or impact.

A specific structure of the connection member for achieving the above-mentioned advantages will be described in detail below through unrestrictive examples of the present invention.

In one specific example, the connection member includes two or more resistance welding units which are set between adjacent vertical slits among the vertical slits; the resistance welding unit may be partitioned into a first welding unit in an upper direction and a second welding unit in a lower direction with respect to the horizontal slit; the connection member may have a structure in which two or more resistance welding units are resistively welded to the electrode terminal of the battery cell to be double bonded.

That is, the connection member includes two or more resistance welding units which are partitioned by slits and the resistance welding units are bonded to the electrode terminal of the battery cell to form multiple bonding, so that a possibility of destruction, fracture, and deformation of the bonded portion due to the external force such as vibration or impact is low.

Further, it should be noted that the current application path from the first welding unit to the second welding unit may be detoured along the vertical slit.

For example, when the resistance welding is sequentially performed in two or more resistance welding units, the reactive current detours to the vertical slit which is adjacent to the resistance welding units. As described above, this is because in the remaining parts of the connection member excluding the resistance welding unit, the interface resistance with respect to the electrode terminal is relatively high.

The detoured application of the reactive current means that the reactive current is dispersed from the active current of the resistance welding units which are actually welded portions and the peripheries to be applied.

For this reason, it is possible to prevent the overcurrent from being applied to the resistance welding units and the periphery thereof and consequently, a battery module which does not have a bonding failure between the connection member and the electrode terminal due to the overcurrent may be implemented.

In the present invention, the metal plate is not specifically limited as long as it is an electro-conductive material. However, the metal plate may be formed of a material having a low electrical resistance and high conductivity and specifically, may be formed of an alloy which includes copper as a first material and at least one of metals selected from a group consisting of zinc, nickel, aluminum, platinum, lead, tin and stainless steel as a second material.

According to the verification of the inventors of the present invention, it is confirmed that when copper which is the first material is less than 90 wt % in content, since the connection member has a relatively high resistance, undesired heat is undesirably generated in a bonded portion of the electrode terminal and the connection member and in contrast, when copper which is the first material exceeds 99 wt % in content, since the resistance of the connection member is relatively low, it is difficult to implement a desired bonding shape due to application of a relatively high reactive current at the time of resistance welding. Generally, during the resistance welding, the reactive current is inversely proportional to a resistance of the welding basic material and as the reactive current is increased, the active current is decreased so that the bonding strength is deteriorated.

Therefore, it is understood that the above-described alloy ratio is particularly important to implement the advantage of the battery module according to the present invention.

Therefore, in the present invention, an alloy ratio of the first material and second material may be 90:10 to 70:30, 97:3 to 75:25, or 98:2 to 80:20 by weight.

An alloy of the first material and the second material may be an alloy containing copper, nickel, and tin or an alloy containing copper and tin, or an alloy containing copper and zinc.

The alloy containing copper, nickel, and tin may contain copper of 98 wt %, nickel of 1 wt %, and tin of 1 wt %.

The alloy containing copper and tin may contain copper of 97 wt % and tin of 3 wt %.

The alloy containing copper and zinc may contain copper of 90 wt % and zinc of 10 wt %.

In one specific example, the vertical slit includes a first slit connected to one end of the horizontal slit, a second slit connected to the other end of the horizontal slit, and a third slit which crosses the horizontal slit between the first slit and the second slit.

In this case, the third slit may be perpendicular to the horizontal slit and a first resistance welding unit may be formed between the first slit and the third slit, a second resistance welding unit may be formed between the second slit and the third slit. The first resistance welding unit may be partitioned into a first welding unit and a second welding unit with the horizontal slit therebetween and the second resistance welding unit may be partitioned into a first welding unit and a second welding unit with the horizontal slit therebetween.

With this structure, welded portions of the first resistance welding unit and the second resistance welding unit are set to be substantially parallel to the horizontal slit so that for example, the welding rod easily moves from one resistance welding unit to the other resistance welding unit. Therefore, it is advantageous for the automated process.

In some cases, the third slit may form an angle of 20 degrees to 160 degrees with respect to the horizontal slit.

Also with this structure, the first resistance welding unit and the second resistance welding unit may be formed as described above, but the third slit is oblique to the horizontal slit. Therefore, the application path of the reactive current which detours to the third slit may be relatively extended.

In the present invention, the first slit, the second slit, and the third slit are desirably formed to have a small size as much as possible because it should be considered that the area of the connection member which is adjacent to the electrode terminal of the battery cell is reduced by the slits and the resistance is increased.

Similarly, even when the number of slits is increased, it means that the contact area of the connection member with the electrode terminal is reduced so that it is not desirable that a plurality of vertical slits is added. According to another aspect, charges are concentrated on an inner cross-section of the slit so that the resistance and the heat generation are significantly high. Therefore, if so many slits are formed in the connection member, performance deterioration may be entirely caused not only in the battery cell, but also in the battery module.

For this reason, in the present invention, an exemplary embodiment that configures the vertical slit by the first slit, the second slit, and the third slit will be described as a desirable example.

A total plane surface area of the first slit, the second slit, and the third slit which occupy the connection member may be 1 to 20% of a plane area of the electrode terminal of the battery cell.

When a slit which has a plane area smaller than a minimum value of the range is resistively welded, there is a possibility that a separated end of the slit is fused to be connected during the resistance welding and a slit which has a plane area exceeding a maximum value of the range is not desirable because it may cause reduction of the area of the connection member which is in contact with the electrode terminal of the battery cell as described.

With this area, the first slit, the second slit, and the third slit may have a predetermined length.

Particularly, the third slit is longer than the first slit or the second slit and specifically, the third slit may have a length which may be larger than 100% and smaller than 130% of the length of the first slit or the second slit. This is because the third slit located between the first slit and the second slit detours the application path of the reactive current in any case so that the current application path may be extended as long as possible.

When the length of the third slit is 100% or smaller, the extension of the current application path cannot be expected and when the length of the third slit exceeds 130%, it is not desirable because an entire area of the connection member which is in contact with the electrode terminal of the battery cell is reduced.

The first slit and the second slit may have the same length or one of them may be shorter than the other and may have desired designs depending on a connection type of the connection member.

Further, the first slit and the second slit are perpendicular to the horizontal slit. In some cases, the first slit and the second slit may have a wedge shape curved with respect to the connected portion with the horizontal slit and an internal angle of the wedge may be implemented to be 120 degrees or larger and smaller than 180 degrees.

In contrast, the first slit and the second slit may be connected to the horizontal slit with a curved line shape on plan view.

In the meantime, in the present invention, the battery cell may be a cylindrical battery cell which is embedded in a cylindrical metal can with an electrode assembly and an electrolytic solution embedded to be closed and sealed with the metal can as a top cap assembly.

Further, the battery cell may be a lithium rechargeable battery having advantages of high energy density, discharging voltage, output stability such as a lithium ion (Li-ion) rechargeable battery, a lithium polymer (Li-polymer) rechargeable battery, or a lithium ion polymer (Li-ion polymer) rechargeable battery.

A cathode is manufactured by applying and drying a mixture of a cathode active material, a conductive material, and a binder on a cathode collector and if necessary, a filler may be added to the mixture.

Generally, the cathode collector may be manufactured to have a thickness of 3 to 500 micrometer. The cathode collector and an extended collecting unit are not specifically limited as long as they do not cause a chemical change in the battery and have a high conductivity. For example, stainless steel, aluminum, nickel, titanium, baked carbon, or aluminum or a stainless steel surface which is treated with carbon, nickel, titanium, or silver may be used. Minute protrusions and depressions are formed on surfaces of the cathode collector and the extended collecting unit to enhance the adhesiveness of the cathode active material and various forms such as a film, a sheet, a foil, a net, a porous body, a foaming body, and a non-woven fabric may be used.

The cathode active material may be a layered compound such as lithium cobalt oxide ($LiCoO_2$) or lithium nickel oxide ($LiNiO_2$), a compound substituted with one or more transition metals; lithium manganese oxide represented by the chemical formula $Li_{1+x}Mn_{2-x}O_4$ (here, x is 0 to 0.33), $LiMnO_3$, $LiMn_2O_3$, or $LiMnO_2$; lithium copper oxide ($Li_2CuO_2$); vanadium oxide such as $LiV_3O_8$, $LiFe_3O_4$, $V_2O_5$, or $Cu_2V_2O_7$, Ni-site type lithium nickel oxide represented by the chemical formula $LiNi_{1-x}M_xO_2$ (here, M is Co, Mn, Al, Cu, Fe, Mg, B or Ga and x is 0.01 to 0.3); lithium manganese composite oxide represented by the chemical formula $LiMn_{2-x}M_xO_2$ (here, M is Co, Ni, Fe, Cr, Zn or Ta and x is 0.01 to 0.1) or $Li_2Mn_3MO_8$ (Here, M is Fe, Co, Ni, Cu or Zn); $LiMn_2O_4$ in which a part of Li in the chemical formula is substituted with an alkaline-earth metal ion; a disulfide compound; or $Fe_2(MoO_4)_3$, but is not limited thereto.

The conductive material of 1 to 30 wt % is usually added on the basis of the total weight of the mixture containing the cathode active material. As long as the conductive material does not cause the chemical change in the battery and has the conductivity, the conductive material is not specifically limited. For example, a conductive material such as a graphite including natural graphite or artificial graphite; carbon black such as carbon black, acetylene black, ketjen black, channel black, furnace black, lamp black, and summer black; a conductive fiber such as carbon fiber or metal fiber; metal powder such as carbon fluoride, aluminum, or nickel powder; conductive whisky such as zinc oxide, or potassium titanate; conductive metal oxide such as titanium oxide; a conductive material such as polyphenylene derivative may be used.

The binder is a component which assists the bonding between the active material and the conductive material and the bonding to the collector and is usually added in an amount of 1 to 30 wt % on the basis of a total weight of the mixture containing a cathode active material. Examples of the binder include polyvinylidene fluoride, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, and various copolymers.

The filler is selectively used as a component which suppresses the expansion of the cathode and is not specifically limited as long as it does not cause the chemical change in the battery and is a fibrous material. For example, olefin polymers such as polyethylene or polypropylene; and a fibrous material such as glass fiber or carbon fiber are used.

The anode is manufactured by applying and drying an anode active material on an anode collector and if necessary, the above-described components may be selectively further included.

The anode collector is prepared to have a thickness of 3 to 500 micrometer. The anode collector is not specifically limited as long as it does not cause a chemical change in the battery and has conductivity and for example, copper, stainless steel, aluminum, nickel, titanium, baked carbon, a copper or stainless steel surface which is treated with carbon, nickel, titanium, or silver, or an aluminum-cadmium alloy may be used. Further, similarly to the cathode collector, minute protrusions and depressions are formed on surfaces of the anode collector to enhance the adhesiveness of the anode active material and various forms such as a film, a sheet, a foil, a net, a porous body, a foaming body, and a non-woven fabric may be used.

For example, as the anode active material, carbon such as hard carbon or graphite carbon; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 elements of the periodic table, halogen; $0 < x \leq 1$; $1 \leq y \leq 3$; $1 \leq z \leq 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; and a Li—Co—Ni-based material may be used.

The separator is interposed between the cathode and the anode and uses an insulating thin film having high ion permeability and mechanical strength. A porous diameter of the separator is normally 0.01 to 10 micrometer and a thickness thereof is normally 5 to 300 micrometer. For example, as the separator, an olefin based polymer such as polypropylene having chemical resistance and hydrophobicity; or a sheet or a non-woven fabric formed of glass fiber or polyethylene may be used. When the solid electrolyte such as polymer is used as the electrolyte, the solid electrolyte may also serve as a separator.

The electrolytic solution may be a non-aqueous electrolytic solution containing a lithium salt and formed of a non-aqueous electrolytic solution and a lithium salt. The non-aqueous electrolytic solution uses a non-aqueous organic solvent, an organic solid electrolyte, and an inorganic solid electrolyte, but it is not limited thereto.

As the non-aqueous organic solvent, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfranc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate may be used.

As the organic solid electrolyte, for example, a polyethylene derivative, a polyethylene oxide derivative, a polypropylene oxide derivative, phosphate ester polymer, poly agitation lysine, polyester sulfide, polyvinyl alcohol, polyvinylidene fluoride, or a polymer including an ionic dissociation group may be used.

As the inorganic solid electrolyte, for example, nitride, halide, or sulfate of Li such as $Li_3N$, LiI, $Li_5NI_2$, $Li_3N$—LiI—LiOH, $LiSiO_4$, $Li_2SiS_3$, $Li_4SiO_4$, $Li_4SiO_4LiI$—LiOH, or $Li_3PO_4$—$Li_2S$—$SiS_2$ may be used.

The lithium salt is a material which is soluble in the non-aqueous electrolyte and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, or imide may be used.

Further, for the purpose of improving a charging-discharging characteristic and the flame retardancy, for example, pyridine, triethylphosphite, triethanolamine, cyclic ether, ethylenediamine, n-glyme, hexaphosphoric triamide, a nitrobenzene derivative, sulfur, quinoneimine dye, N-substituted oxazolidinone, N,N-substituted imidazolidine, ethylene glycol dialkyl ether, ammonium salt, pyrrole, 2-methoxy ethanol, or aluminum trichloride may be added to the non-aqueous electrolytic solution. In some cases, a halogen-containing solvent such as carbon tetrachloride or ethylene trifluoride may be further added to impart nonflammability, or a carbon dioxide gas may be further added to improve the high-temperature storage characteristics and FEC (fluoro-ethylene carbonate) or PRS (propene sultone) may be further added.

In a specific example, a lithium salt such as $LiPF_6$, $LiClO_4$, $LiBF_4$, LiN $(SO_2CF_3)_2$ is added to a mixed solvent of a cyclic carbonate of EC or PC which is a high-dielectric solvent and a linear carbonate of DEC, DMC, or EMC which is a low-viscosity solvent to prepare a non-aqueous electrolyte containing lithium salt.

The present invention further provides a battery module manufacturing method.

The method includes: pressurizing a connection member to an electrode terminal of a battery cell;

initially bonding the resistance welding unit and the electrode terminal by disposing welding rods in a first welding unit and a second welding unit of a resistance welding unit adjacent to a first slit and forming an active current which detours the electrode terminal between the welding rods; and additionally bonding the resistance welding unit and the electrode terminal by disposing welding rods in the first welding unit and the second welding unit of the resistance welding unit adjacent to a second slit and forming an active current which passes through the electrode terminal between the welding rods.

In the initial bonding, a reactive current which does not pass through the electrode terminal may be additionally formed between the welding rods and the reactive current may be applied to the second welding unit along a periphery of the first slit of the connection member from the first welding unit.

Further, also in the additional bonding, a reactive current which does not pass through the electrode terminal may be additionally formed between the welding rods, the reactive current may be applied to the second welding unit along a periphery of the third slit of the connection member from the first welding unit, and at the time of current application, the reactive current may pass through the electrode terminal bonded in the initial bonding.

As described above, according to the battery module manufacturing method according to the present invention, the resistance welding is performed on the resistance welding units set in the connection member two times so that the connection member and the electrode terminal are double-bonded, thereby implementing a stable bonding structure.

According to the battery module manufacturing method, during the welding process of the resistance welding units, the application path of the reactive current is blocked by the first slit and the third slit which are the vertical slits to be detoured so that even though the resistance welding is performed two times, the destruction of the connection member due to overcurrent may be prevented.

MODE FOR INVENTION

Hereinafter, exemplary embodiments of the present invention will be described in detail with reference to the accompanying drawings. However, in description of the present invention, description for known functions or configurations will be omitted to clarify the gist of the present invention.

In order to clearly describe the present invention, parts which are not related to the description will be omitted and like reference numerals designate like elements throughout the specification. Further, the size and the thickness of components illustrated in the drawings are optionally illustrated for better understanding and ease of description and the present invention is not necessarily limited to those illustrated in the drawings.

Figure 6:
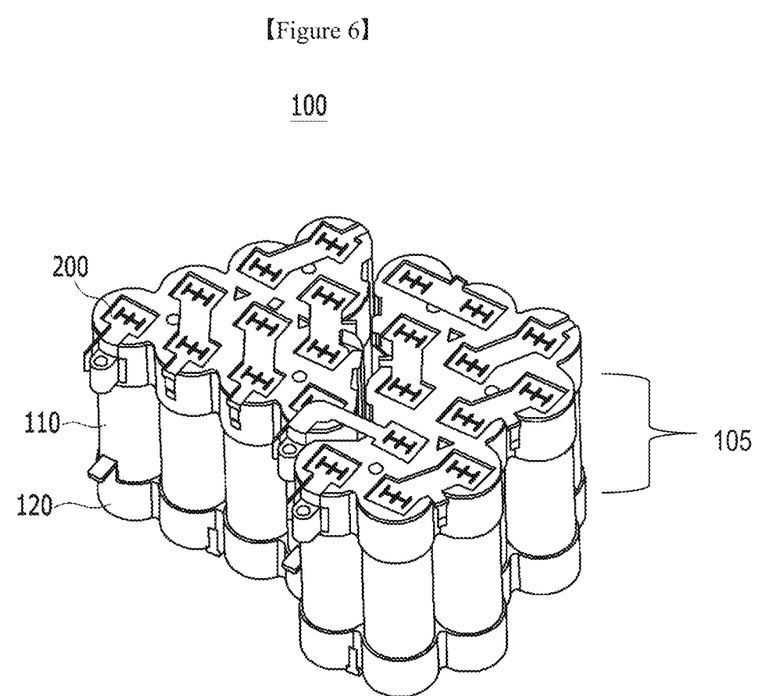
FIG. 6 is a schematic view of a battery module according to an exemplary embodiment of the present invention.
Figure 7:
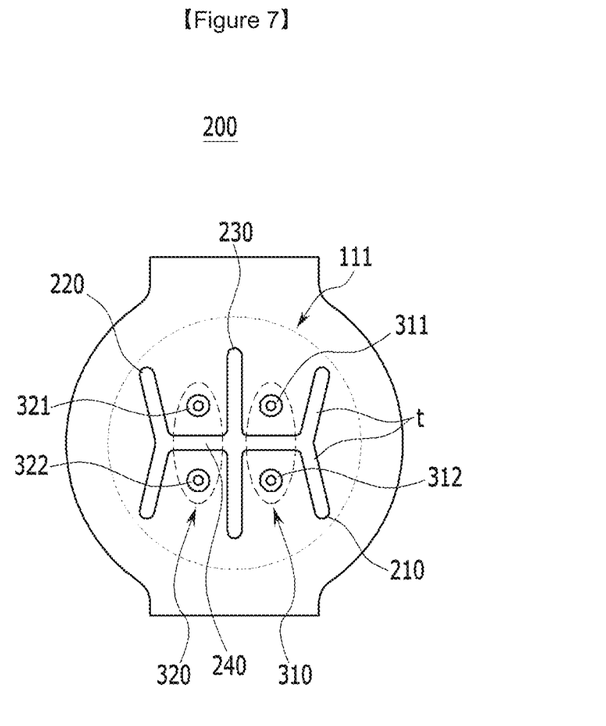
FIG. 7 is a plan view of a connection member which configures a battery module of FIG. 6.

FIG. 6 illustrates a schematic view of a battery module according to an exemplary embodiment of the present invention and FIG. 7 illustrates a plan view of a connection member which configures a battery module of FIG. 6.

First, referring to FIG. 6, a battery module 100 includes a battery cell arrays 105, a plurality of battery cells 110, a cell frame 120, and a plurality of connection members 200.

The battery cell arrays 105 are configured such that the plurality of battery cells 110 in which electrode terminals (20 in FIG. 2) located at both ends of a cylindrical battery cell are located toward the same direction is disposed in a lateral direction to be mounted in the cell frame 120.

Each of the connection members 200 is a bus bar which is bonded to the electrode terminal 111 of each battery cell 110 of the battery cell arrays 105 and is connected to the battery cell arrays 105 so as to connect one or two battery cells 110 to each other.

Further, each of the connection members 200 is an electro-conductive metal plate and for example, is a composite material formed by alloying copper having a low resistance with an electro-conductive metal, for example, at least one selected from a group consisting of zinc, nickel, aluminum, platinum, lead, tin, and stainless steel.

As an example, the connection member 200 may be an alloy material containing copper of 98 wt %, nickel of 1 wt % of nickel, and tin of 1 wt %.

As another example, the connection member 200 may be an alloy material containing copper of 97 wt % and tin of 3 wt %.

In contrast, the connection member 200 may be an alloy material containing copper of 90 wt % and zinc of 10 wt %.

However, these are examples selected in the scope of the present invention and the connection member 200 of the present invention is not limited thereto.

Hereinafter, a shape of the connection member 200 coupled to one electrode terminal 111 of the battery cell 110 will be described in more detail with reference to FIG. 7.

In the connection member 200, a plurality of slits 210, 220, 230, and 240 in a vertical direction and a horizontal direction is perforated. Particularly, the horizontal slit 240 is perforated in the connection member 200 so as to connect the vertical slits 210, 220, and 230 and the vertical slits 210, 220, and 230 are perforated in the connection member 200 to be spaced apart from each other.

The connection member 200 also includes a first resistance welding unit 310 and a second resistance welding unit 320 which are set between adjacent vertical slits among the vertical slits 210, 220, and 230.

The first resistance welding unit 310 and the second resistance welding unit 320 are partitioned into first welding units 311 and 321 in an upper direction and second welding units 312 and 322 in a lower direction with respect to the horizontal slit 240.

Therefore, in the connection member 200, the first resistance welding unit 310 and the second resistance welding unit 320 which are independent welded portions are resistively welded to the electrode terminal 111 of the battery cell 110.

Therefore, the connection member 200 is double-bonded with the electrode terminal 111 of the battery cell 110 and the battery module 100 forms a stable connection by the double-bonding of the connection member 200 and the electrode terminal 20 of the battery cell 110 so that a possibility of defects such as deformation and breakage of the bonded shape between the electrode terminal 20 and the connection member 200 due to the external force such as vibration and impact is significantly reduced.

The vertical slits 210, 220, and 230 include a first slit 210 connected to one end of the horizontal slit 240, a second slit 220 connected to the other end of the horizontal slit 240, and a third slit 230 which crosses the horizontal slit 240 between the first slit 210 and the second slit 220.

In this case, the third slit 230 is perpendicular to the horizontal slit 240.

The first resistance welding unit 310 is set between the first slit 210 and the third slit 230.

The second resistance welding unit 320 is set between the second slit 220 and the third slit 230.

The first resistance welding unit 310 is partitioned into a first welding unit 311 and a second welding unit 312 with the horizontal slit 240 therebetween.

The second resistance welding unit 320 is partitioned into a first welding unit 311 and a second welding unit 312 with the horizontal slit 240 therebetween.

The third slit 230 is 10% longer than the first slit 210 or the second slit 220.

The first slit 210 and the second slit 220 have the same length and have a wedge shape curved at a predetermined angle t with respect to a portion connected to the horizontal slit 240. An internal angle of the wedge is approximately 120 degrees.

An advantage obtained by the wedge shape of the first slit 210 and the second slit 220 will be described.

The first resistance welding unit 310 formed between the wedge shaped first slit 210 and the third slit 230 has a wide area as compared with a first slit 210 having a straight line shape.

This means that a contact area for the electrode terminal 111 of the battery cell 110 is wide and further means that an electric conductive efficiency of the electrode terminal 111 and the connection member 200 is excellent. The same advantage is obtained by the second resistance welding unit 320 formed between the second slit 220 and the third slit 230.

Figure 8:
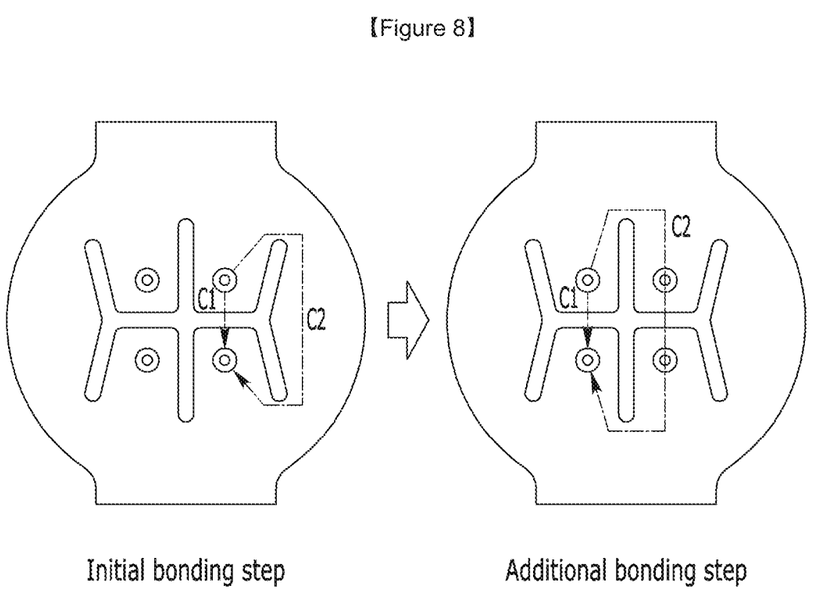
FIG. 8 is a schematic view illustrating a welding method of a connection member of FIGS. 6 and 7.

In the meantime, FIG. 8 illustrates a schematic view of a welding method of the connection member 200 of FIGS. 6 and 7.

Referring to FIG. 8 and FIGS. 6 and 7 together, a structural advantage of the connection member according to the present invention and a method for welding the connection member to the electrode terminal will be described.

First, an advantage of the connection member 200 is that when the first slit 210, second slit 220 and third slit 230 in the vertical direction are connected to the horizontal slit 240, the welded portion is set as independent two units of the first resistance welding unit 310 and the second resistance welding unit 320 and thus at the time of resistance welding, the application path of the reactive current C2 is blocked by the first slit 210, the second slit 220 and the third slit 230 to be detoured.

Particularly, when a voltage is applied to welding rods after disposing and pressurizing welding rods in the first welding unit 311 and the second welding unit 312 in the first resistance welding unit 310 adjacent to the first slit 210, the active current C1 which is applied to the second welding unit 312 via the electrode terminal 20 from the first welding unit 311 is formed.

That is, even though the first welding unit 311 and the second welding unit 312 are divided by the horizontal slit 240, the first welding unit 311 and the second welding unit 312 are closely adhered to the electrode terminal 111 so that the active current C1 which is converted into an actual thermal energy is directly applied from the first welding unit 311 to the second welding unit 312.

The first welding unit 311 and the second welding unit 312 are fused by the resistance formed during this process and the heat generated thereby so that the first resistance welding unit 310 of the connection member 200, more specifically, the first welding unit 311 and the second welding unit 312 are bonded to the electrode terminal 111.

However, during this process, a reactive current C2 which does not pass through the electrode terminal 111 is additionally formed between the welding rods.

Here, the entire connection member 200 is not closely adhered to the electrode terminal 111 except for the first welding unit 311 and the second welding unit 312 so that the interface resistance for the electrode terminal 111 is formed to be high in the entire connection member 200.

Therefore, the reactive current C2 is applied only through the connection member 200 having a low resistance except for the interface having a relatively high resistance.

However, in the connection member 200 according to the present invention, since the first welding unit 311 of the first resistance welding unit 310 is blocked by the horizontal slit 240, the first slit 210, and the third slit 230, the reactive current C2 is detoured along a periphery of the first slit 210 to be applied to the second welding unit 312.

For this reason, at the time of resistance welding, the active current C1 and the reactive current C2 are not concentrated to the first resistance welding unit 310 and the periphery thereof. In other words, an overcurrent in which the reactive current C2 is included in the active current C1 is not formed in the first resistance welding unit 310 which is an actual welded portion, so that the problems such as destruction, fracture of the connection member 200 and deterioration of welding quality due to the overcurrent may be solved. The above-described process is defined as an initial bonding step.

Next, in the second resistance welding unit 320 adjacent to the third slit 230, when the voltage is applied to the welding rods after disposing and pressuring the welding rods in the first welding unit 321 and the second welding unit 322, the active current C1 which is applied to the second welding unit 322 via the electrode terminal 111 from the first welding unit 321 of the second resistance welding unit is formed.

The first welding unit 321 and the second welding unit 322 of the second resistance welding unit 320 are fused by the resistance formed during this process and the heat generated thereby so that the second resistance welding unit 320 of the connection member 200 is additionally bonded to the electrode terminal 111. The above-described process is defined as an additional bonding step.

That is, since the connection member 200 according to the present invention is bonded to the electrode terminal 111 in respective resistance welding units 310 and 320 set in this unit, the double bonding to the electrode terminal 111 may be established.

However, since the first resistance welding unit 310 and the electrode terminal 111 which have been already bonded is substantially integrated to each other, during the welding process of the second resistance welding unit 320, the reactive current may be applied through the first resistance welding unit 310 and the electrode terminal 111 which have been already bonded.

Therefore, the interface resistance is formed to be relatively high in the entire connection member 200 except for the already bonded first resistance welding unit 310 and the electrode terminal 20 and the first welding unit 321 and the second welding unit 322 of the second resistance welding unit 320.

Accordingly, when the second resistance welding unit 320 is welded, the reactive current C2 is applied through the connection member 200 having a low resistance or the first resistance welding unit 310 which is already bonded and does not have substantially an interface resistance, except for the interface having a relatively high resistance.

However, in the connection member 200 according to the present invention, since the third slit 230 partitions the second resistance welding unit 320 and the first resistance welding unit 310, the reactive current C2 is detoured along the periphery of the third slit 230 and then applied to the second welding unit 322 of the second resistance welding unit 320 through the first welding unit 311 and the second welding unit 312 of the first resistance welding unit 310.

For this reason, even though the resistance welding is additionally performed, the active current C1 and the reactive current C2 are not concentrated to the second resistance welding unit 320 and the periphery thereof. In other words, even though the resistance welding is performed two times, the problems in that the overcurrent is generated and the connection member 200 is broken or the welding quality is deteriorated due to the overcurrent may be solved.

Figure 9:
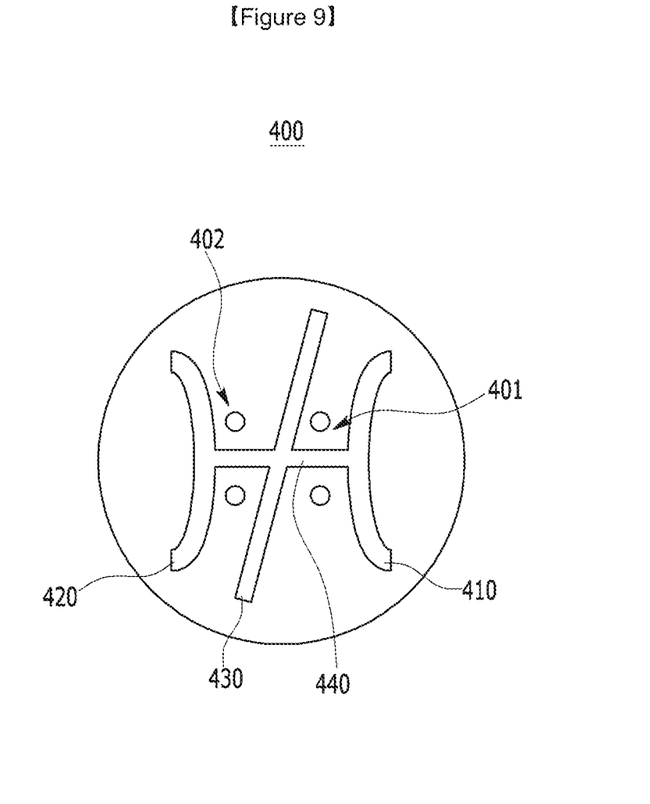
FIG. 9 is a plan view of a connection member according to another exemplary embodiment of the present invention.

In the meantime, FIG. 9 illustrates a plan view of a connection member according to another exemplary embodiment of the present invention.

Referring to FIG. 9, a connection member 400 includes a first slit 410, a second slit 420, and a third slit 430 which are vertical slits and a horizontal slit 440. The first slit 410 is connected to one end of the horizontal slit 440. The second slit 420 is connected to the other end of the horizontal slit 440. The third slit 430 which crosses the horizontal slit 440 may be perforated between the first slit 410 and the second slit 220.

A first resistance welding unit 401 is set between the first slit 410 and the third slit 430. A second resistance welding unit 402 is set between the second slit 420 and the third slit 430. The third slit 430 is 10% longer than the first slit 410 or the second slit 420.

The first slit 410 and the second slit 420 may have a round shape having a curved line in the plan view.

The first slit 410 and the second slit 420 having the structure as described above have an advantage in that a current application distance is longer than that of the straight line.

The third slit 430 is approximately 10% longer than the first slit 410 or the second slit 420 and forms an angle of approximately 110 degrees with respect to the horizontal slit 440 to be perforated in a straight line.

According to this structure, the third slit 430 is oblique with respect to the horizontal slit 440 so that the application path of the reactive current which detours to the third slit 430 may be relatively extended.

Although specific examples of the present invention have been described and illustrated, the present invention is not limited to the described example and it is obvious to those skilled in the art that various changes and modification can be made without departing from the spirit and scope of the present invention. Therefore, the changes and modifications are not construed individually from the technical spirit or viewpoint of the present invention and it is intended that the modified embodiments fall into the scope of the claims of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

As described above, an advantage of the battery module according to the present invention is that the connection member includes three or more vertical slits and a horizontal slit connecting three slits.

The connection member is bonded to the electrode terminal through two times or more resistance welding to form an excellent welding quality and bonding shape. As a result, in the battery module of the present invention including the connection member, the electrical connection structure between the battery cell and the connection member may be stably maintained despite the external force such as vibration or impact, based on the structure in which the electrode terminal of the battery cell and the connection member are bonded two times or more.

Further, in the battery module manufacturing method according to the present invention, resistance welding is performed on the resistance welding units set in the connection member two times or more so that the connection member and the electrode terminal are double-bonded to implement a stable bonding structure. Further, during the welding process of the resistance welding units, the application path of the reactive current is blocked by the first slit and the third slit which are vertical slits to be detoured so that the destruction of the connection due to the overcurrent may be prevented despite two times of resistance welding.

The invention claimed is:
1. A battery module, comprising:
at least one battery cell array including a cell frame and a plurality of battery cells, each battery cell having electrode terminals disposed at both ends of each battery cell and oriented toward the same direction, the plurality of battery cells being disposed in a lateral direction when mounted in the cell frame; and
a plurality of connection members attached to the electrode terminals of a respective battery cell of the at least one battery cell array at an upper portion, a lower portion, or both of the at least one battery cell array,
wherein each connection member is a metal plate having at least three vertical slits that are spaced apart from each other and a horizontal slit that crosses at least one of the vertical slits,
wherein the at least three vertical slits include:
a first slit connected to one end of the horizontal slit;
a second slit connected to another end of the horizontal slit; and
a third slit which crosses the horizontal slit between the first slit and the second slit, and
wherein a length of the third slit is larger than 100% and smaller than 130% of a length of the first slit or a length the second slit,
wherein each connection member includes two or more resistance welding units set between adjacent vertical slits among the at least three vertical slits,
wherein each of the two or more resistance welding units is partitioned into a first welding unit in an upper direction and a second welding unit in a lower direction with respect to the horizontal slit,
wherein the two or more resistance welding units set in each connection member are resistively welded to the electrode terminals of the respective battery cell, and
wherein each connection member includes a current application path along one of the at least three vertical slits configured so that the current application path taken by a reactive current from the first welding unit to the second welding unit is extended along the one of the at least three vertical slits.

2. The battery module of claim 1, wherein the metal plate includes an alloy of copper as a first material and at least one metal selected from a group consisting of zinc, nickel, aluminum, platinum, lead, tin, and stainless steel as a second material.

3. The battery module of claim 1, wherein the third slit is perpendicular to the horizontal slit.

4. The battery module of claim 1, wherein the third slit forms an angle of 20 degrees to 160 degrees with respect to the horizontal slit.

5. The battery module of claim 1, wherein the first slit and the second slit are perpendicular to the horizontal slit.

6. The battery module of claim 1, wherein:
the first slit and the second slit have a wedge shape curved with respect to a portion connected to the horizontal slit and an internal angle of the wedge shape is 120 degrees or larger and less than 180 degrees.

7. The battery module of claim 1, wherein the first slit and the second slit are connected to the horizontal slit with a curved line on plan view.

8. The battery module of claim 1, wherein each battery cell is a cylindrical battery cell comprising:
a cylindrical metal can that is closed and sealed as a top cap assembly;
an electrode assembly and an electrolytic solution embedded in the cylindrical metal can.

9. A method of manufacturing the battery module of claim 1, the method comprising:
pressurizing a connection member among a plurality of connection members to an electrode terminal of a battery cell among the plurality of battery cells;
initially bonding the two or more resistance welding units and the electrode terminals by disposing welding rods in the first welding unit and the second welding unit of a resistance welding unit adjacent to a first slit among the at least three vertical slits and forming an active current which passes through an electrode terminal among the electrode terminals between the welding rods; and
disposing the welding rods in the first welding unit and the second welding unit of the resistance welding unit adjacent to a second slit among the at least three vertical slits and forming the active current which passes through the electrode terminal between the welding rods to additionally bond the resistance welding unit and the electrode terminal.

10. The method of claim 9, wherein in the initial bonding, a reactive current which does not pass through the electrode terminal is additionally formed between the welding rods, and
wherein the reactive current is applied to the second welding unit along a periphery of the first slit of the connection member from the first welding unit.

11. The method of claim 9, wherein in the additional bonding, a reactive current which does not pass through the electrode terminal is additionally formed between the welding rods,
wherein the reactive current is applied to the second welding unit along a periphery of a third slit among the at least three vertical slits of the connection member from the first welding unit, and
wherein at the time of current application, the reactive current passes through the electrode terminal bonded in the initial bonding.

12. The battery module of claim 1, wherein the third slit is not parallel to the first slit and the second slit.

13. The battery module of claim 1, wherein the first slit is not parallel to the second slit.

* * * * *